Oct. 19, 1937.  D. C. HEITSHU  2,096,038
PLANTER
Filed July 27, 1935
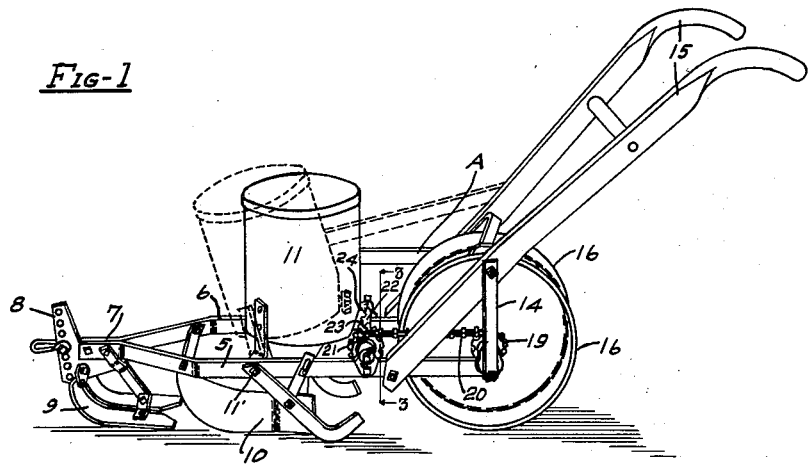
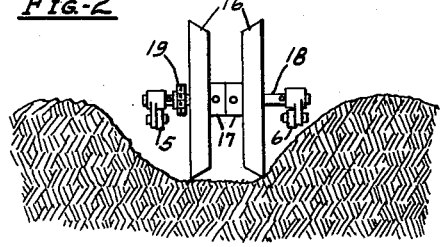
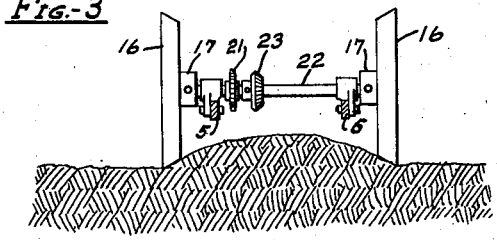
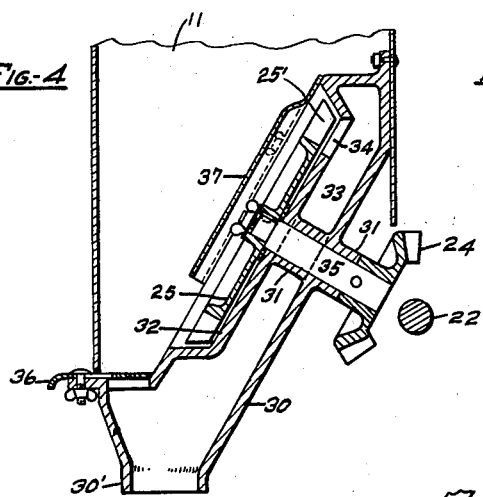
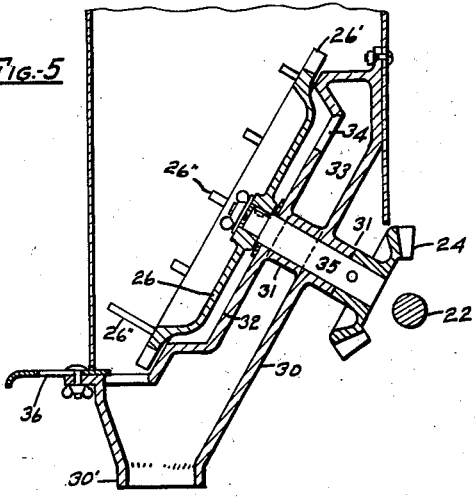
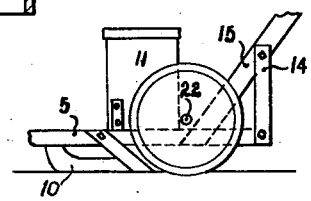
INVENTOR.
DANIEL C. HEITSHU
BY James A. Walsh
ATTORNEY Patented Oct. 19, 1937

2,096,038

UNITED STATES PATENT OFFICE 2,096,038

PLANTER

Daniel C. Heitshu, Racine, Wis., assignor to J. I. Case Company, Racine, Wis., a corporation Application July 27, 1935, Serial No. 33,451

6 Claims. (Cl. 111—71)

My present invention relates to the class of implements known as walking planters designed to plant cotton and other row crops including beans, corn, peanuts, peas and the like, and embodies improvements whereby one implement with slight modifications, and appropriate seed dropping equipment such, for example, as disclosed in my copending divisional application Serial No. 65,216, filed February 24, 1936, may be utilized for handling all of such crops, whereas it has heretofore been necessary, so far as I am aware, to have an individual planter for cotton, another for corn, beans, etc., and sometimes a third planter for fertilizer. My improvement further includes means for converting the planter into what is known as the rear wheel type to be in condition for flat or furrow planting, and also for transposing the implement into a side-wheel planter suitable for planting in raised beds, which is accomplished in a comparatively simple and expeditious manner, as will hereinafter more fully appear.

In the accompanying drawing, forming part hereof, Figure 1 is a perspective view of a planter embodying my improvements; Fig. 2, a view looking from the rear of the implement with certain parts removed, showing the wheels thereof positioned to travel in and actuating the seeding mechanisms to plant in furrows or flat beds; Fig. 3, a view taken on the dotted line 3—3 in Fig. 1 showing the wheels transposed to a drive shaft mounting so adjusted as to traverse raised beds or hills; Fig. 4, a transverse sectional view of the seed can with an inclined seed plate therein; Fig. 5 is a transverse section of a seed can equipped with a cotton picker-wheel; and Fig. 6 is a fragmentary side view of my planter with the wheels transposed for planting in raised beds as in Fig. 3.

In said drawing the numerals 5, 6, indicate the frame of the planter, the members of which converge at their forward ends, as at 7, and to which a draft member 8 and shoes 9 are attached, as is common, a runner 10 of well known construction being supported by the frame, as also a seed can 11, in any suitable manner. At the rear of the frame 5, 6, standards 14 are secured forming part of a wheel mounting and to which and the frame members handles 15 are connected for guiding the implement.

When it is desired to operate the planter in furrows, as indicated in Fig. 2, the wheels 16, including hubs 17, are fixedly mounted on an axle 18 to rotate the latter, said wheels being positioned within the frame members 5, 6, to produce a rear wheel type of planter, and a sprocket 19 is mounted on said axle 18, which is connected, by a chain 20, to a sprocket 21 on a jack-shaft 22, the latter carrying a bevel gear 23 engaging a bevel gear, as 24, for rotating a seed selecting and dropping plate 25, Fig. 4, or picker-wheel 26, Fig. 5, as may be installed in the seed can 11, as will further appear.

When planting in raised beds or hills, indicated in Fig. 3, the wheels 16, axle 18 and chain 20 are removed from the frame or mounting 14 etc. and the wheels are then transposed to the outer ends of the jack-shaft 22 and fixedly secured thereto so as to rotate the jack-shaft, its gear 23, which normally engages the gear 24, rotating the latter to actuate the seed dropping mechanisms in like manner as when the implement is used in furrow planting, and in which condition the implement is of the side-wheel type of planter adapted to straddle raised beds of earth in its travel.

As disclosed in my aforesaid copending application, the seed can 11 at its lower end is connected to an inclined casting comprising a wall 30, bearings 31, and a seat 32 spaced from the wall to form a conduit 33, said seat having a port 34 therein, and through which bearings 31 a shaft 35 extends, having at its inner end a seed plate 25, or a picker-wheel 26, according to the seed to be planted, and which seed dropping elements are preferably formed, as indicated, to fit into the seat 32, the casting terminating in a spout 30', and the shaft 35 carrying the bevel gear 24 at its outer end. The seed plate 25 having a shield 37 thereover is so made as to fit within the seat 32, the cups 25' thereof coinciding with port 34 so that seed may be deposited in conduit 33, and the picker-wheel 26 is constructed in such manner as to cover port 34 to prevent seed in the can from passing through said port. As indicated in Fig. 5, the lower end of seat 32 terminates in spaced relation to the wall of the spout 30', and which space may be opened or closed by a sliding valve 36 for a purpose to appear.

The can 11 is pivoted to the frame members, as at 11', so that by means of a latch A it can be tilted forwardly, as indicated by dotted lines in Fig. 1, and its bevel gear 24 disengaged from gear 23 on shaft 22 to render the seeding mechanisms in the can inoperative when the implement is moved about or when not in use.

While I have briefly described the seed-can and operating mechanisms associated therewith which I prefer to employ with my improved planter, said parts and the operation thereof are specifically described in my said application referred to herein, but it will be understood that any appropriate receptacle and seed droppers may be employed.

I claim as my invention:

1. In a planter, a frame, seed dropping means mounted on the frame, removable wheels supported at the rear of the frame for conveying and operating the planter through furrows, a drive shaft on the frame to which said wheels may be transposed for straddling and planting earth beds, means on the shaft engaging the seed dropping means for actuating the latter, means connecting the wheels and shaft for operating the latter to actuate the seed dropping means when furrow planting, and means for securing the wheels to the shaft for rotating the latter to actuate the seed dropping means when planting in earth beds.

2. In a planter, a frame, seed dropping mechanism on the frame, transposable wheels on the rear of the frame for supporting the latter, a removable axle on the frame for supporting the wheels when planting furrows, means connecting the axle and seed dropping mechanism including a drive shaft forming an actuating means to which said wheels may be transposed for operating the planter in earth beds.

3. In a planter, a frame, seeding mechanism mounted on the frame, a removable axle supported by the frame, transposable wheels mounted on the axle in rearward relation to the seed dropping mechanism, a shaft on the frame in advance of the axle and having end portions arranged to receive said wheels, actuating means on the shaft engaging and operating said seed dropping mechanism, and means connecting the axle and shaft for actuating the latter.

4. In a planter a frame, seed dropping mechanism carried by the frame, a drive shaft journaled on the frame, actuating means on the shaft engaging the seed dropping mechanism for operating the same upon rotation of the shaft, a wheel-mounting on the frame longitudinally spaced from said drive shaft and arranged for mounting wheels in closely spaced relation, driving connections from said mounting to said drive shaft, and wheels removably mounted on said mounting for carrying the planter and rotating the drive shaft through said connections, said wheels being transposable to the drive shaft for operation in widely spaced relation for straddling earth beds, carrying the planter and rotating the shaft.

5. In a planter a frame, seed dropping mechanism carried by the frame, a drive shaft journaled on the frame, actuating means on the shaft engaging the seed dropping mechanism for operating the same upon rotation of the shaft, a wheel-mounting on the frame longitudinally spaced from said drive shaft and arranged for mounting wheels for carrying the planter, wheels removably mounted in position on said mounting, and connections from one of said wheels to said drive shaft, said wheels being transposable to be mounted in position on the drive shaft for carrying the planter and rotating the shaft, said wheels being closely spaced for furrow planting when mounted in one position and widely spaced for straddling earth beds when mounted in the other position.

6. In a planter a frame, seed dropping mechanism carried by the frame, a drive shaft journaled on the frame, actuating means on the shaft engaging the seed dropping mechanism for operating the same upon rotation of the shaft, wheels for carrying the planter, and longitudinally spaced means for mounting said wheels alternatively in widely spaced position for straddling earth beds, or in closely spaced position for furrow planting, said means including a connection for rotating said shaft from rotation of the wheels for actuating the seed dropping mechanism.

DANIEL C. HEITSHU.